United States Patent [19]

Zabinski

[11] Patent Number: 5,699,272

[45] Date of Patent: Dec. 16, 1997

[54] WATER SOFTENING SYSTEM WITH SELF ADJUSTING RINSE CYCLE

[75] Inventor: John E. Zabinski, Naperville, Ill.

[73] Assignee: Culligan International Company, Northbrook, Ill.

[21] Appl. No.: 604,773

[22] Filed: Feb. 22, 1996

[51] Int. Cl.$^6$ ............................................................ C02F 1/42
[52] U.S. Cl. ........................... 364/500; 210/662; 210/673; 210/110; 324/443
[58] Field of Search ..................................... 210/662, 673, 210/110, 96.1; 364/500, 502; 324/443

[56] References Cited

U.S. PATENT DOCUMENTS

| | | | |
|---|---|---|---|
| 4,299,698 | 11/1981 | Rak et al. | 210/662 |
| 4,536,845 | 8/1985 | De Vale et al. | 364/500 |

OTHER PUBLICATIONS

1994 Culligan International Company, *Culligan© Mark 100 Automatic Water Conditioner*, Cat. No. 01–8818–91 Rev. Apr. 1994.
*Culligan Mark 87G Water Conditioners*, Culligan International Company (Date Unknown).
Grunbeck Wasseraufbereitung brochure, *Weichwassermeister GS 2* (Date Unknown).
Cillit–Parat CD brochue (Date Unknown).
Benckiser brochure, *Bewados Flüssigschutz* (Date Unknown).
Benckiser brochure, *Der neue Bewamat SE Super–Electronic* (Date Unknown).

*Primary Examiner*—Emanuel T. Voeltz
*Assistant Examiner*—Kamini S. Shah
*Attorney, Agent, or Firm*—Gerstman, Ellis & McMillin, Ltd.

[57] ABSTRACT

A water softening system is provided in which a determination is made whether the slow rinse cycle of a regeneration has been completed or is abnormal. A reference cell and a spaced sensing cell are provided in a water tank. The impedance difference of the solution between the reference cell and the sensor cell is sensed. If the impedance difference is a first state, then after a predetermined period of time a determination is made if the impedance difference is a second state. If the impedance difference is a second state, then after a predetermined period of time a determination is made if the impedance difference is a third state. If the impedance difference is a third state, this indicates that the sodium ion concentration is uniformly reduced in the zone between the reference cell and the sensing cell and that the slow rinse cycle has been completed.

15 Claims, 9 Drawing Sheets

WATER SOFTENING SYSTEM WITH SELF ADJUSTING RINSE CYCLE

FIELD OF THE INVENTION

The present invention concerns a novel water softening system and, more particularly, a system for determining when the rinse cycle of the regeneration of a water softener has been completed.

BACKGROUND OF THE INVENTION

In Rak et al. U.S. Pat. No. 4,299,698, issued Nov. 10, 1981, an apparatus is disclosed for regenerating the ion exchange bed of a water softener. The apparatus includes an electronic control circuit using a probe carrying two pairs of spaced electrodes which are connected in a bridge circuit. The upper pair of electrodes comprise a sensor cell and the bottom pair of electrodes comprise a reference cell. A control signal and a reference signal are obtained from the sensing cell and reference cell for closing an energizing circuit and latching it until it is time for regeneration, which will occur at preset times to avoid interfering with normal water usage.

Although Rak et al. U.S. Pat. No. 4,299,698 discloses a circuit for determining when regeneration is necessary, I have discovered a system in which a spaced reference cell and a spaced sensing cell can be utilized to determine whether the rinse cycle of the regeneration has been completed or is abnormal. I have discovered that the impedance difference of the solution in the water tank between the reference cell and the sensing cell goes through three stages during the slow rinse portion of regeneration. At the beginning of stage one of the slow rinse, the entire bed is in a sodium ion rich state immediately after the brine draw. During stage two of the slow rinse, raw water enters the top of the tank and the excess sodium brine is drawn out of the drain tube at the bottom. A high sodium ion—low sodium ion front forms and gradually advances down through the tank as it reduces the sodium ion concentration. The third stage occurs when the sodium ion concentration is uniformly reduced in the zone between the sensing cell and the reference cell. I have discovered that the slow rinse is not complete or is abnormal if these three stages do not occur.

It is an object of the invention to provide a system utilizing my discovery of the three stages and determining whether the slow rinse cycle of a regeneration on a water softener has been completed or is abnormal.

Other objects and advantages of the present invention will become apparent as the description proceeds.

SUMMARY OF THE INVENTION

In accordance with the present invention, a water softening method is provided which comprises the steps of providing a reference cell in a water tank and a spaced sensing cell in the water tank. The impedance difference of the solution in the water tank between the reference cell and the sensor cell is sensed. If the impedance difference is a first state, then after a predetermined period of time a determination is made if the impedance difference is a second state. If the impedance difference is a second state, then after a predetermined period of time a determination is made if the impedance difference is a third state. If the impedance difference is a third state, then after a predetermined period of time the rinse cycle is completed.

In the illustrative embodiment of the invention, the first state is when the sensor cell impedance is less than or equal to the reference cell impedance. The second state is when the sensor cell impedance is greater than the reference cell impedance, and the third state is when the sensor cell impedance is less than or equal to the reference cell impedance.

In the illustrative embodiment of the invention, a bridge is provided with the reference and sensor cells as branches of the bridge. The first state is when the bridge is balanced; the second state is when the bridge is unbalanced; and the third state is when the bridge is balanced.

In accordance with one embodiment of the present invention, a water softening apparatus is provided. The water softening apparatus comprises a water tank, a brine tank, a conduit for providing brine from the brine tank to the water tank, a conduit for providing water to the water tank, and a conduit for providing a path for water discharge from the water tank. A reference cell is provided in the water tank and a spaced sensing cell is provided in the water tank. A circuit is provided for sensing the impedance difference of the solution in the water tank between the reference cell and the sensor cell. A microprocessor is provided for aiding in determining if the impedance difference is a first state, then determining if the impedance difference is a second state, and then determining if the impedance difference is a third state. If the impedance difference is in the third state, the rinse cycle is completed thereafter.

In the illustrative embodiment, the rinse cycle is completed after a predetermined time after the occurrence of the third state.

A more detailed explanation of the invention is provided in the following description and claims, and is illustrated in the accompanying drawings.

DETAILED DESCRIPTION OF THE ILLUSTRATIVE EMBODIMENT

Figure 1:
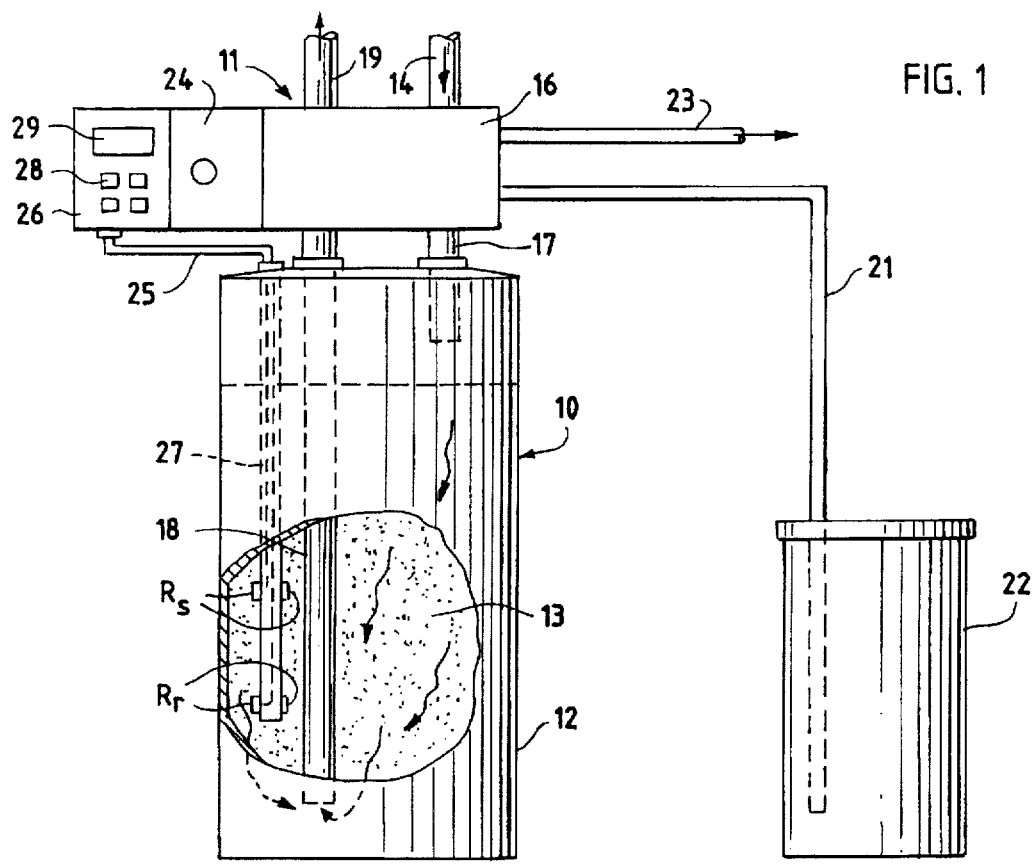
FIG. 1 is a an elevational view of a water softening system in accordance with the principles of the present invention, with certain portions cut away for clarity.

Referring to FIG. 1, a water conditioning or softening apparatus or device 10 is illustrated having a control unit 11. The water conditioning apparatus 10 includes a water tank 12 containing a bed 13 of suitable ion exchange resin. In order to provide water to the tank, a water supply line 14 is connected via valve housing 16 which passes the water through a pipe 17 extending to the tank 12. The water passes down through the bed 13 and is removed via pipe 18 through the valve housing 16 to a line 19 which supplies the softened water to the water system. A conduit 21 extends from the valve control to a brine tank 22 which contains salt for forming the brine. A drain conduit 23 is also connected to the valve housing 16 and is connected to a suitable drain.

The control valve structure 16 may be of a type that is well known to those skilled in the art, and the specific control valve structure does not form a part of the present invention. A recycling control 24 controls the recycling of the system and is controlled by a microprocessor-controlled circuit 26, which is illustrated schematically and in block form in FIG. 2. Control circuit 26 is connected via lines 25 to two pairs of vertically mounted electrodes $R_s$ and $R_r$, which are mounted in a suitable holding probe unit 27 (FIG. 1) which extends down into the water tank 12. Electrodes $R_s$ and $R_r$ are vertically spaced relative to each other for detecting the impedance difference of the solution in the water tank between the electrodes $R_s$ which form sensing cell $R_s$ and electrodes $R_r$ which form reference cell $R_r$.

In Rak et al. U.S. Pat. No. 4,299,698, spaced electrodes $R_s$ and $R_r$ are used for determining when regeneration of the water softener should occur for energizing a latching circuit. The present invention contemplates utilizing the spaced sensing cell and reference cell for detecting the three stage phenomena in order to determine when the slow rinse cycle is completed and thereby to utilize the three stage phenomena for water conservation, diagnostics, and to eliminate any source of possible error in the setting of the slow rinse time. In this manner, variations in water pressure are compensated for. Further, by utilizing the three stage phenomena, in the present invention the rinse time can be adjusted to be precise. This is in sharp contrast to typical prior art softening systems which utilize a fixed slow rinse cycle. The fixed time is typically based on a look-up table that is based on the salt dosage and the hardness of the water.

In the process of water softening, there are a number of steps. The first step is the backwash step in which the water enters the unit in reverse. The water flows from the bottom to the top of the water tank and the purpose of the backwash is to remove any large particles and to loosen the bed so that it is not overly compacted.

The next step is the brine/draw and brine/rinse. This step has two functions. Its first function is to introduce brine into the water softener tank 12 from brine tank 22 via conduit 21. Microprocessor control circuit 26 decides how much brine should be drawn in and that is programmed through a salt dosage setting. The number of pounds of salt is entered via keypad 28, displayed on display 29, and the software decides how much water should be put into the brine tank based on the entered number of pounds of salt.

Brine is drawn in for a number of minutes until a specific gravity detector valve at the bottom of the brine tank causes the brine/draw cycle to discontinue and the cycle is then changed to a slow rinse cycle. In accordance with the present invention, the three stage phenomena is utilized to determine when the slow rinse cycle should be discontinued. To this end, when the rinse cycle begins, the bed of the water softener is surrounded totally by sodium ions. As hard water enters into the water tank 12, it enters from the top of the tank via conduit 17 and it starts to form a low sodium/high sodium front at the top of the tank. This front will gradually advance downward towards the bottom of the tank and end up in the middle of the cells $R_s$ and $R_r$. This is the second stage. Thereafter, the low sodium/high sodium front moves down the tank beyond the lower, reference cell indicating that the water in the bed is now fresh and that the slow rinse can be discontinued. This is the third state and the slow rinse cycle can be discontinued a short predetermined time after the third state is achieved.

Figure 2:
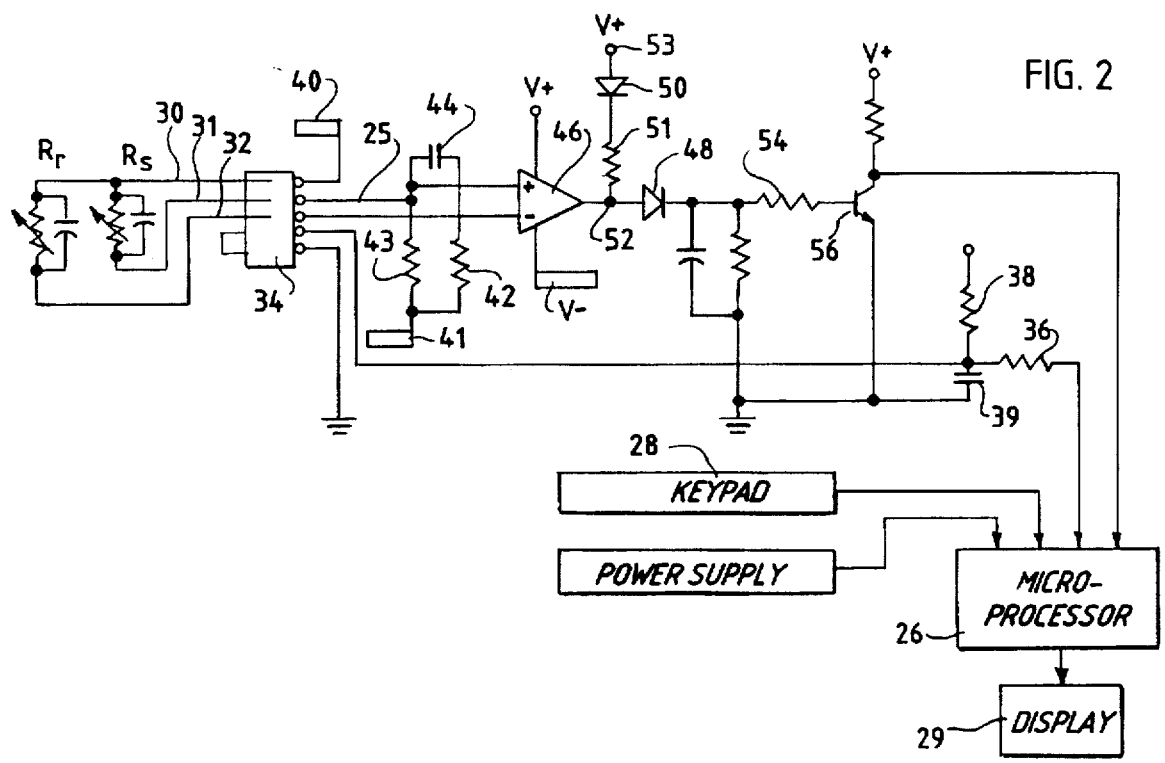
FIG. 2 is a circuit and block diagram of a control circuit for the water softening system of FIG. 1.

The circuit for controlling the cycles is illustrated in FIG. 2. Referring to FIG. 2, reference cell $R_r$ and spaced sensing cell $R_s$ carried by probe 27 (FIG. 1) are connected via lines 30, 31 and 32 to pins 1, 2 and 3 of plug 34. Pin 4 is connected to the microprocessor 26 via line 35 with a resistor 36 present to prevent the microprocessor 26 from any latchup condition. Resistor 38 and capacitor 39 operate as an indicator to indicate to microprocessor 26 that the probe is present (i.e., it has been plugged in) and this provides the appropriate signal to the microprocessor. When the probe 27 is not plugged in there will be a 5 volt signal and when the probe is plugged in the pins 4 and 5 of plug 34 will be shorted so there will be a zero volt signal.

Reference cell $R_r$ forms one arm of a wheatstone bridge circuit. Sensing cell $R_s$ forms another arm of the wheatstone bridge circuit. The probe is excited with an AC voltage across points 40 and 41. The AC voltage prevents scaling in that if a DC voltage were used, scaling could be present on the cells $R_r$ and $R_s$. Resistor 42 forms another arm of the wheatstone bridge and resistor 43 forms the fourth arm of the wheatstone bridge. Capacitor 44 is used as a filter capacitor to prevent RF noise from affecting the circuit or false signals. The output of the wheatstone bridge is connected to comparator 46, the output of which is an open collector device that can be either off or on depending on whether the probe is in balance or out of balance. Comparator 46 itself has an internal transistor. When the comparator is off, the output of the comparator is a half-wave rectified signal resembling a trapezoid signal. When the comparator is on, the output of the comparator is a DC voltage.

Thus when the comparator 46 is off, there is a DC voltage at the output of diode 48 and when the comparator is on, the output of diode 48 is at ground. When the comparator is on the cells are balanced and when the comparator is off the cells are unbalanced. At states 1 and 3 the comparator is on and at state 2 the comparator is off.

A diode 50 and resistor 51 are connected in series to point 52 between the output of comparator 46 and the anode of diode 48. The phase relationship at point 53 is critical to the phase relationship of the AC signal at points 40 and 41.

The output of diode 48 is coupled through resistor 54 to an NPN transistor 56. Transistor 56 operates to turn the DC voltage at the output of diode 48 into a zero to 5 DC volt signal for the microprocessor 26.

Thus the circuit of FIG. 2 operates to determine whether the probe with cells $R_r$ and $R_s$ is balanced or unbalanced. In the first stage, the probe is balanced, and in the second stage the probe is unbalanced; and in the third stage the probe is balanced again.

Figure 3A:
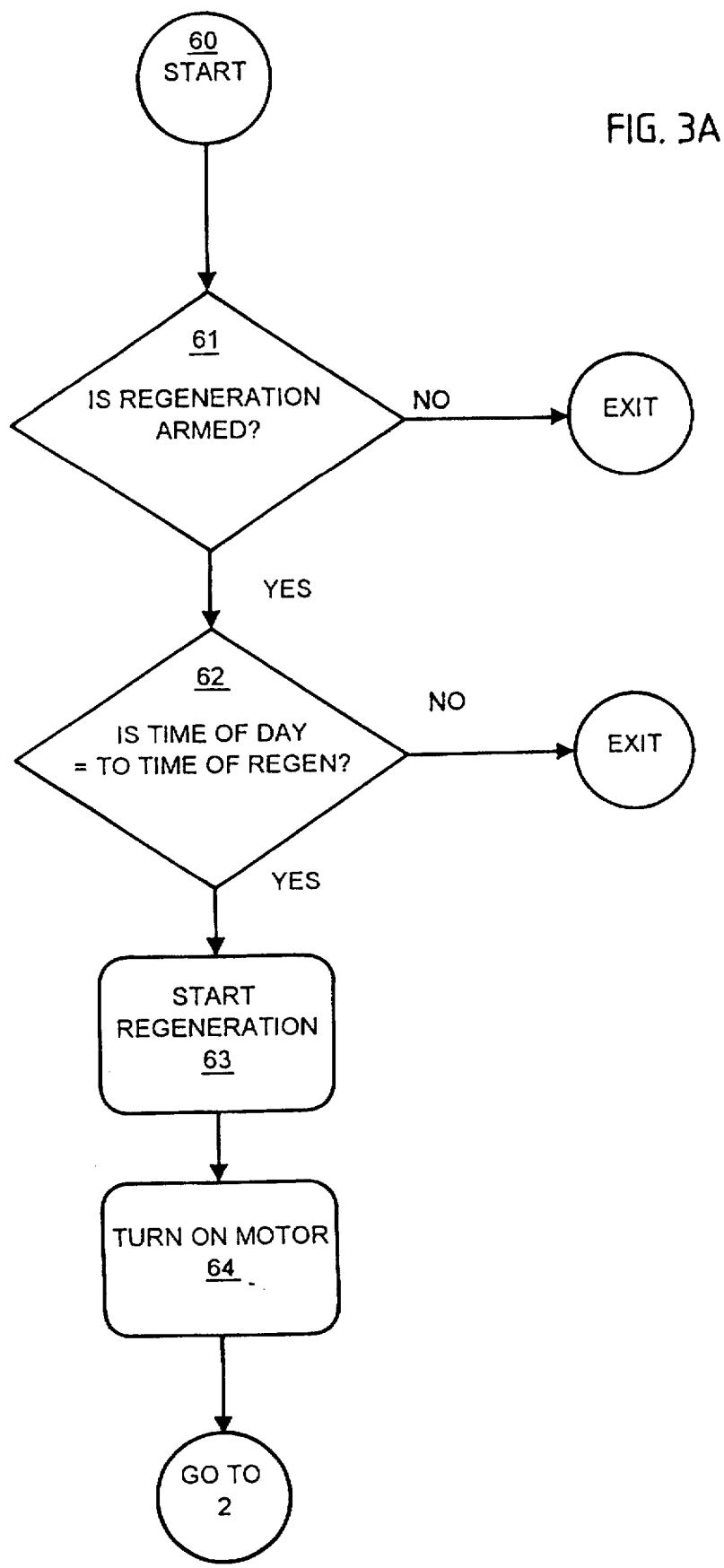
FIGS. 3a–3e comprise a flow chart showing the microprocessor-controlled regeneration.
Figure 3B:
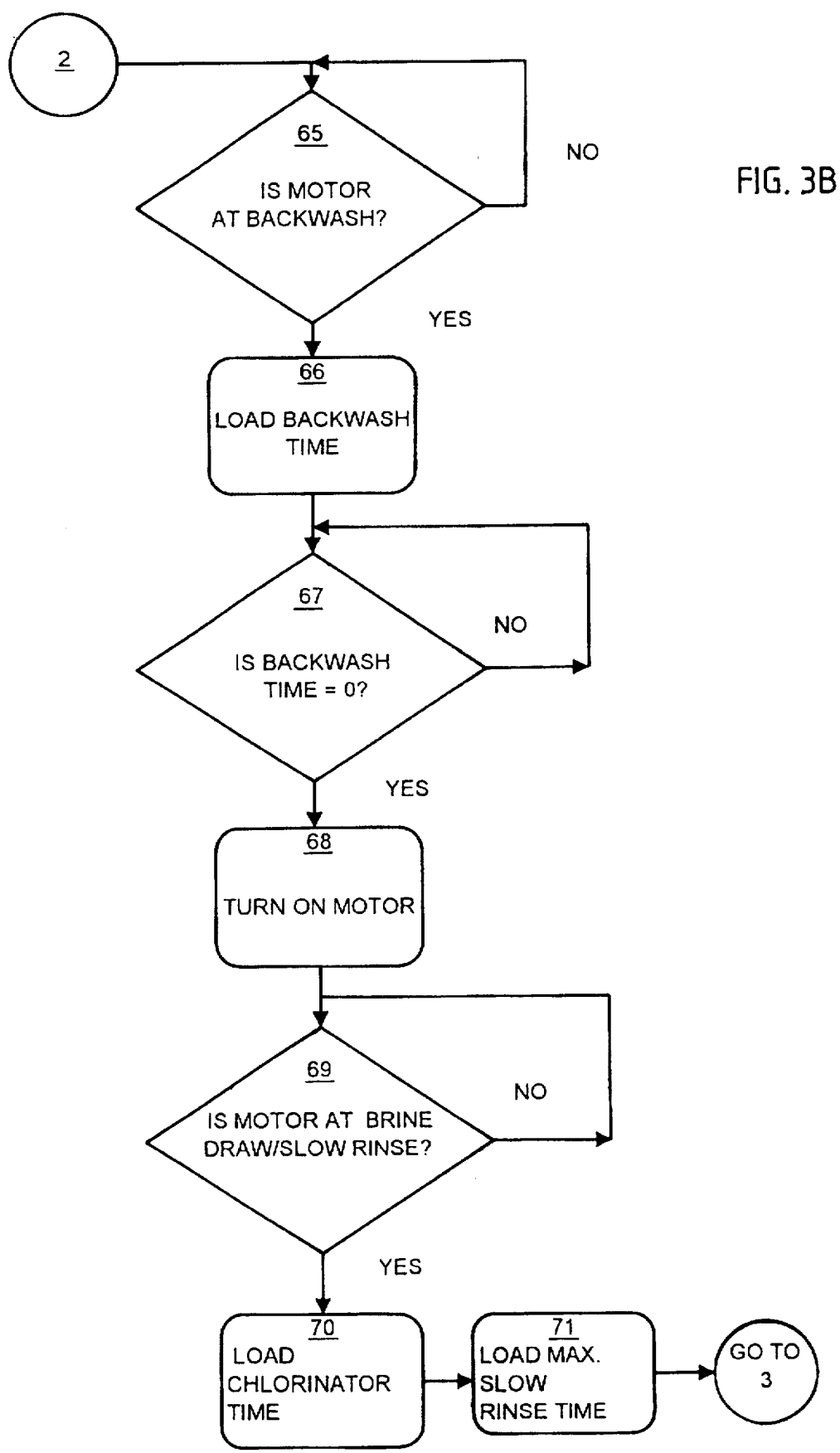
Figure 3C:
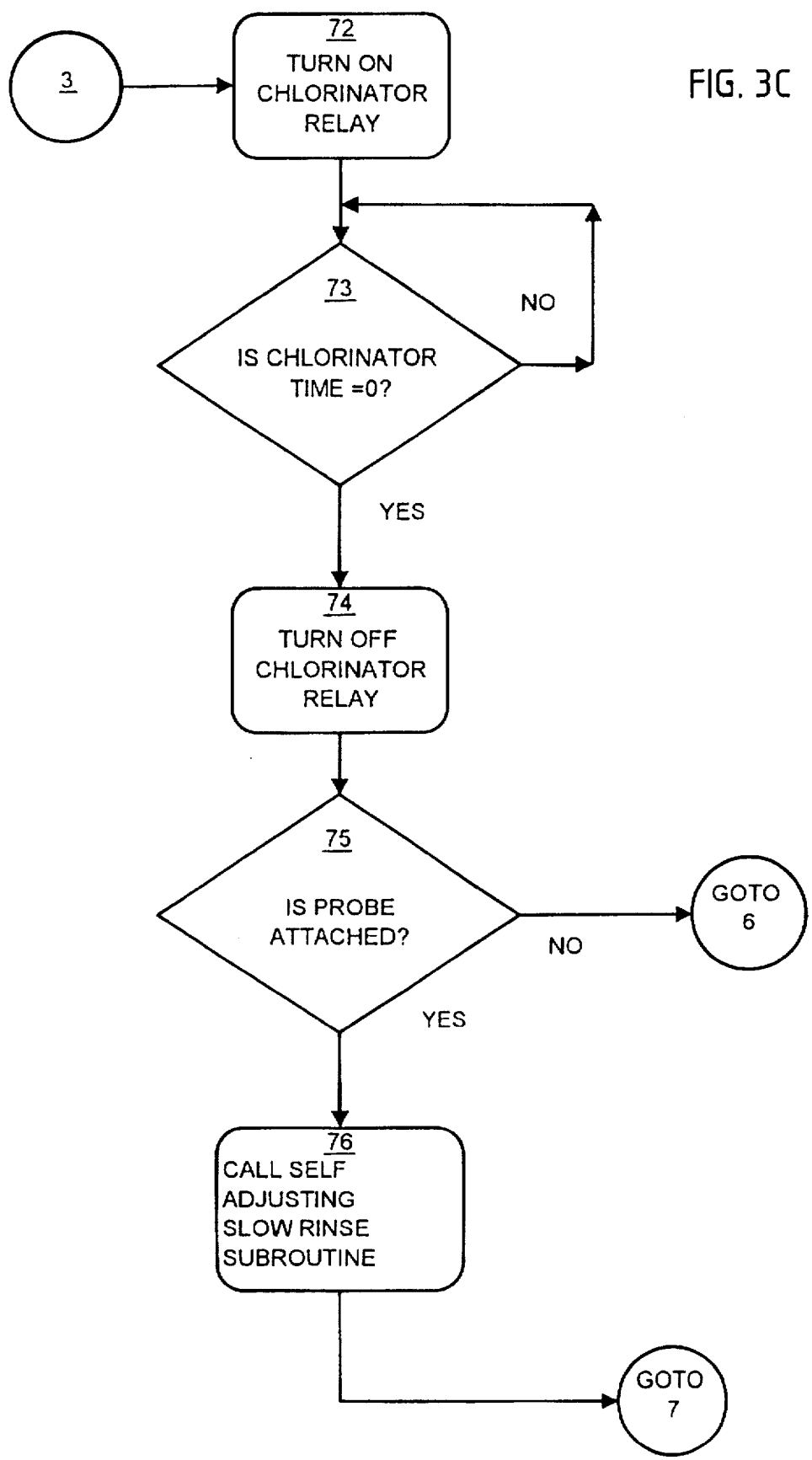
Figure 3D:
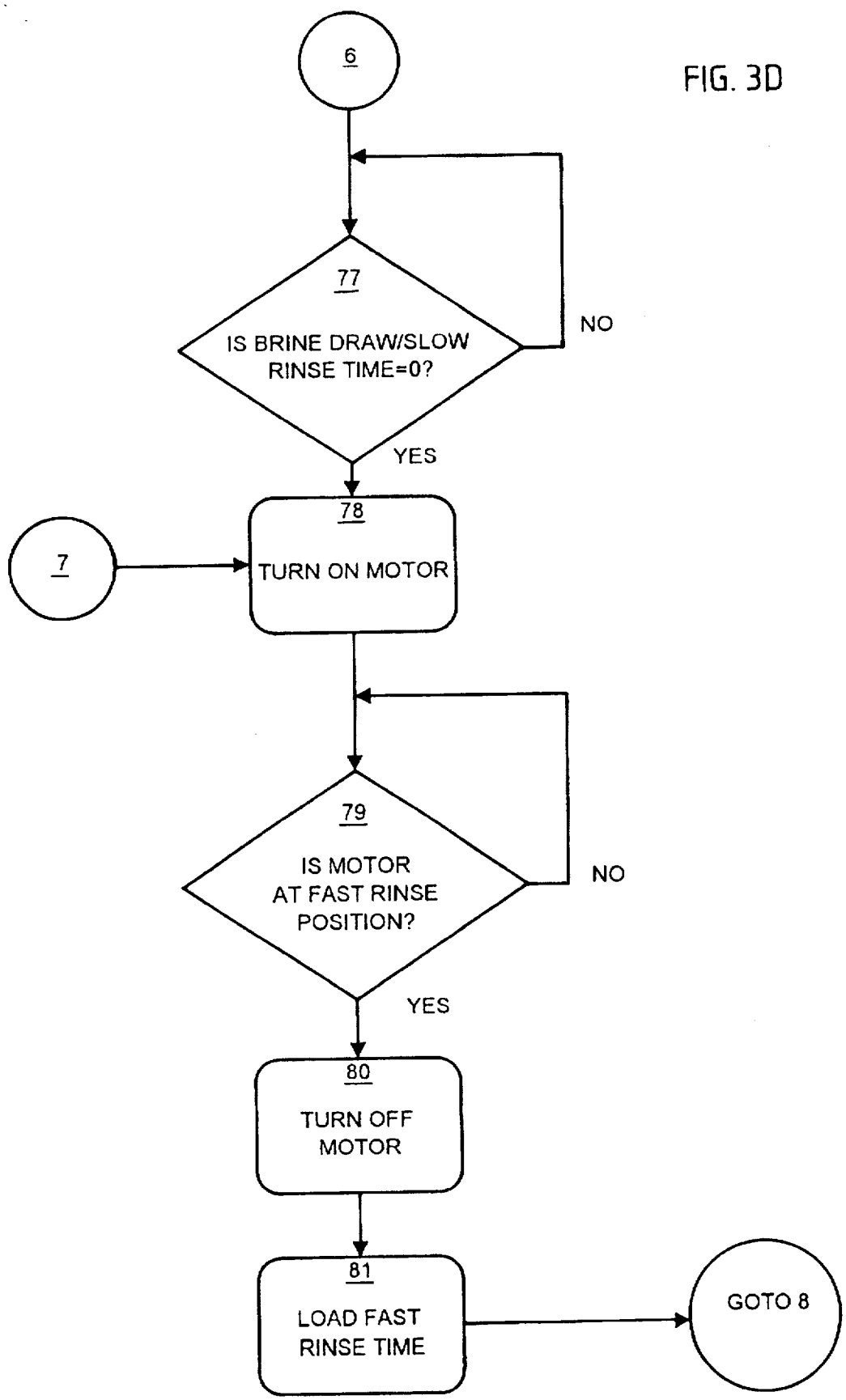
Figure 3E:
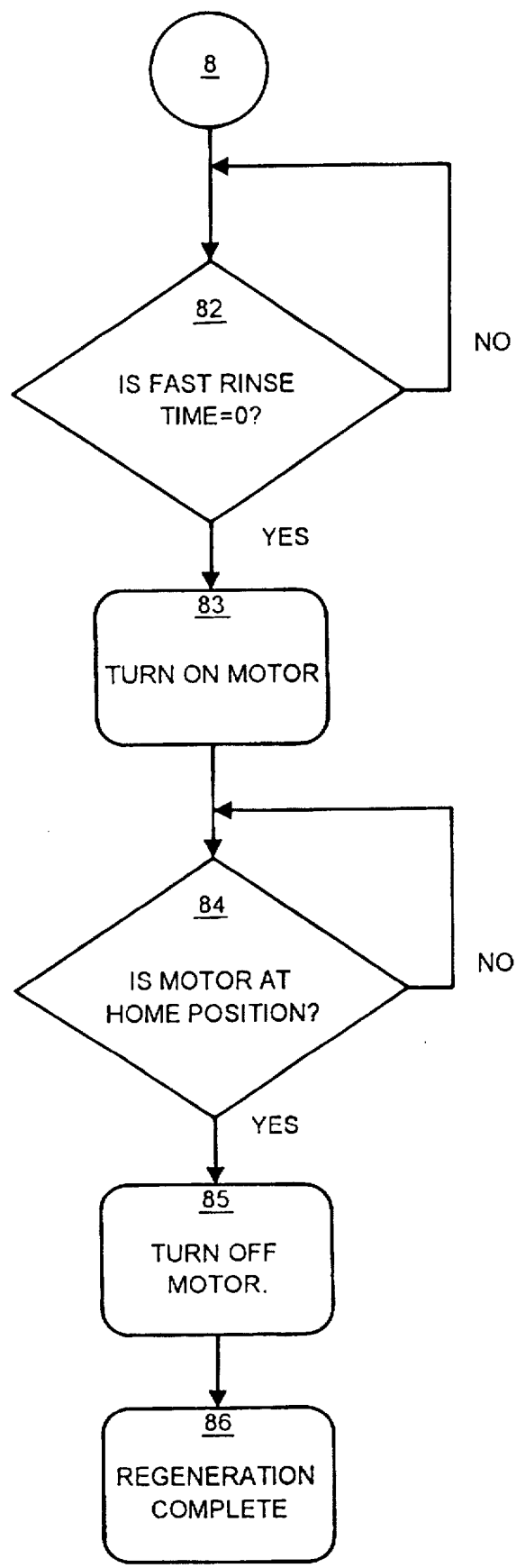
Figure 4A:
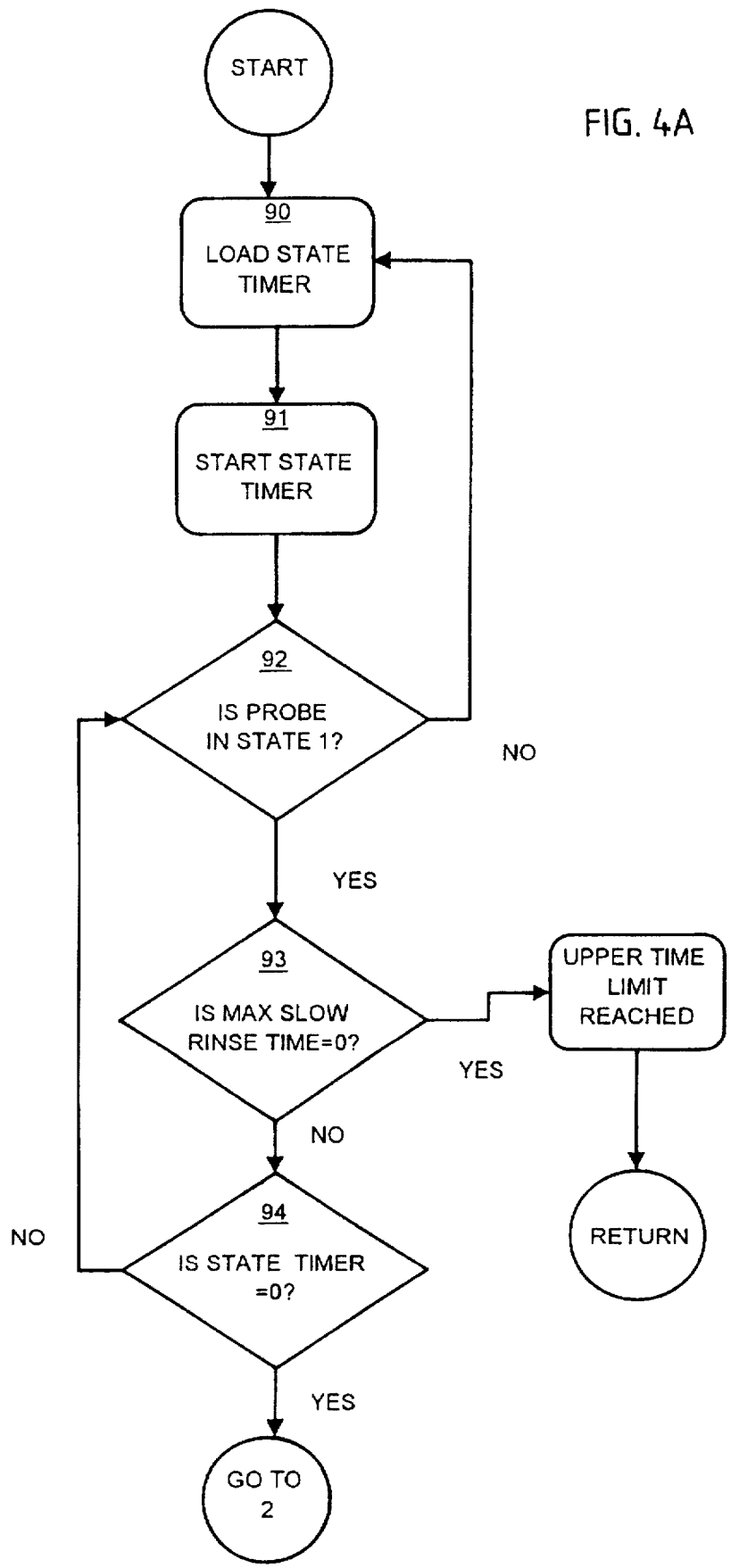
FIGS. 4a–4c comprise a flow chart showing the microprocessor-controlled self-adjusting slow rinse subroutine.
Figure 4B:
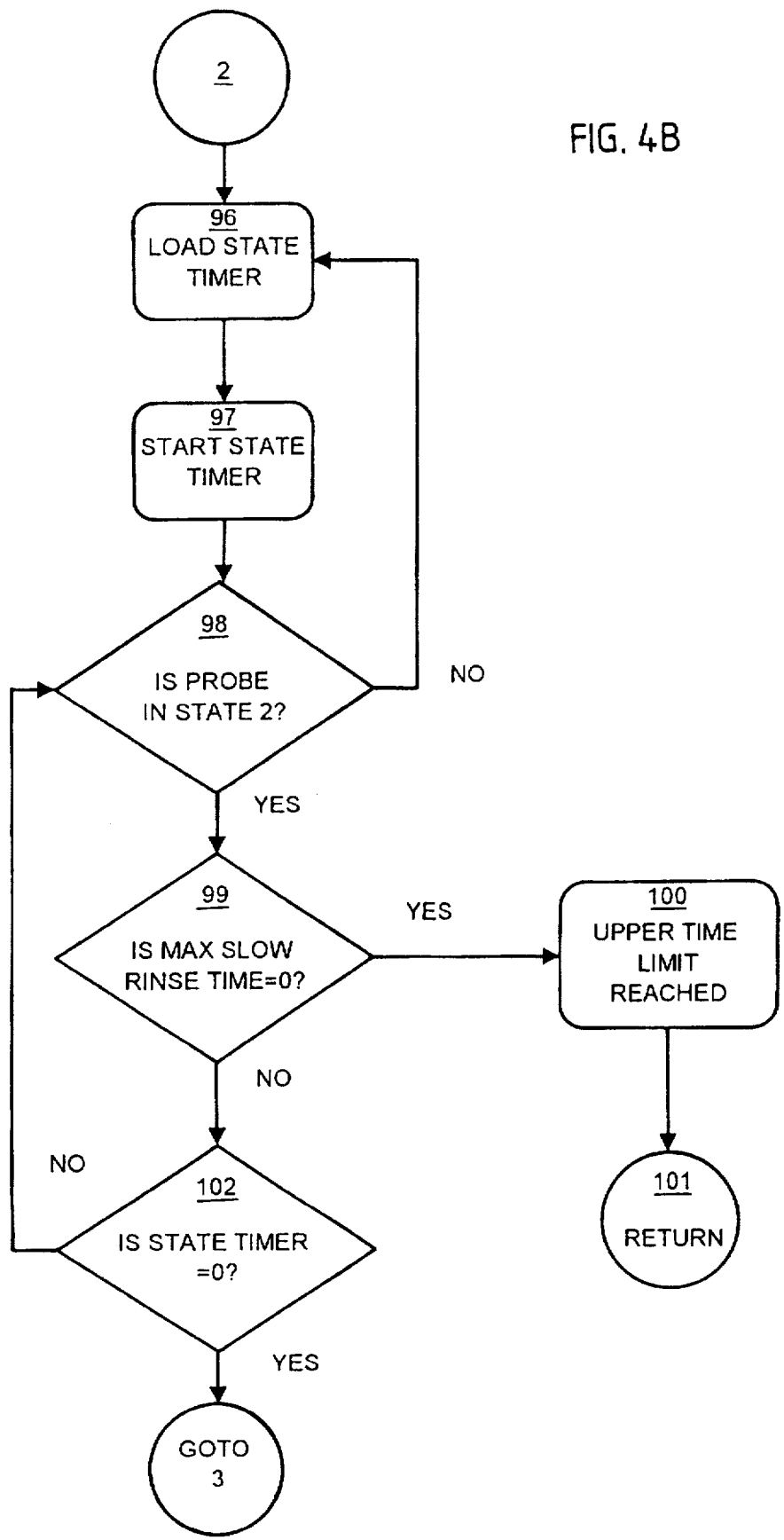
Figure 4C:
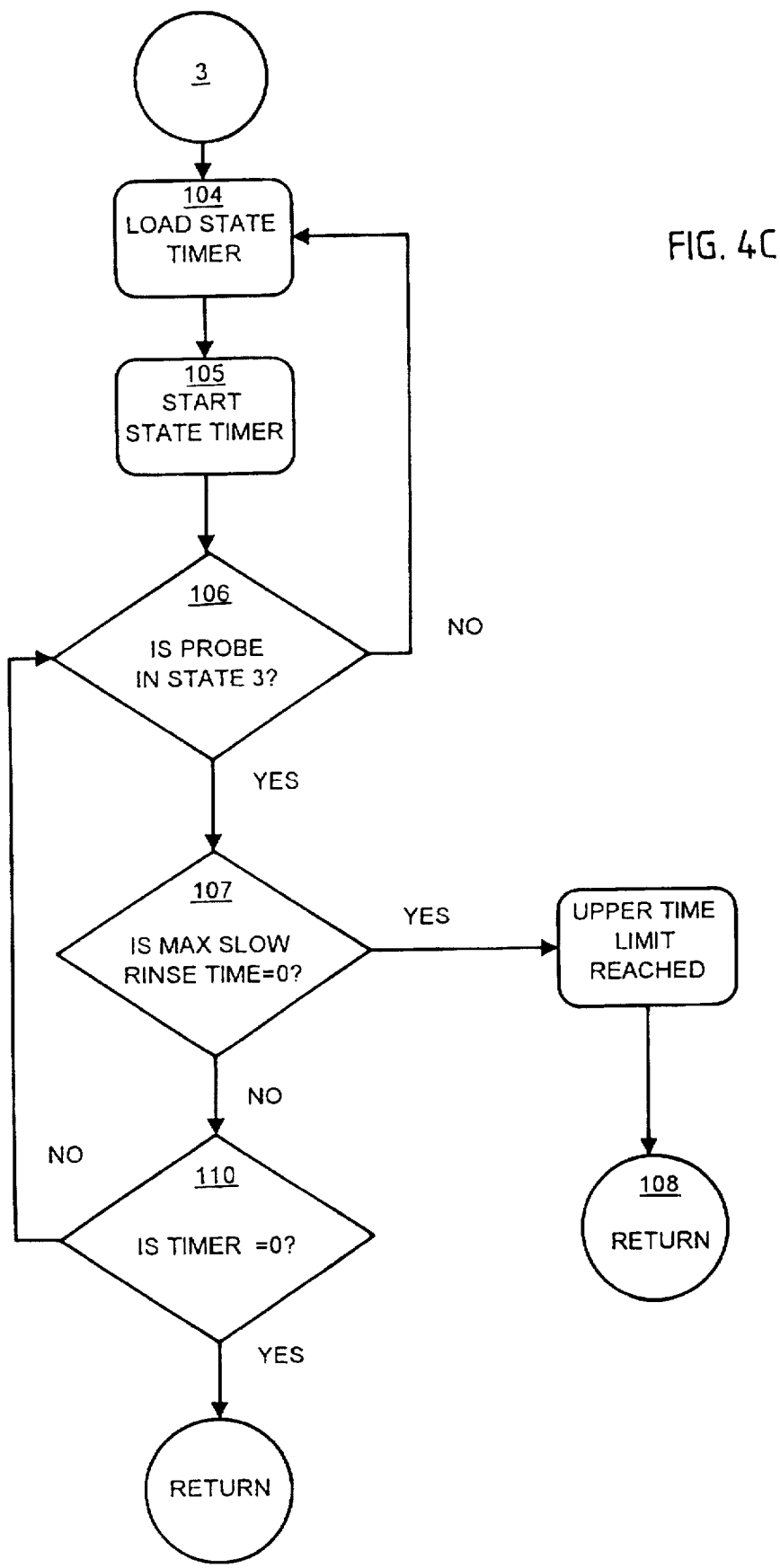

A flowchart showing the microprocessor-controlled regeneration is illustrated in FIGS. 3a–3e and a flowchart showing the microprocessor-controlled self-adjusting slow rinse subroutine is illustrated in FIGS. 4a–4c.

Referring to FIGS. 3a–3e, after start (60) a determination is made whether the regeneration is armed (61). This determination is made based upon the impedance difference of the solution in the water tank between the reference cell $R_r$ and the sensing cell $R_s$. If regeneration is armed, a determination is made whether it is the time of day for regeneration to occur (62). As an example, the system may be set so that regeneration can only occur between 2:00 a.m. and 6:00 a.m. If it is regeneration time, then regeneration is started (63) and the motor is turned on (64). A determination is made whether the motor is at backwash (65). If it is set to backwash, backwash time is loaded (66) and backwash will continue until the timer times out (67). Once the timer times out the motor is turned on (68) and a determination is made whether the motor is at brine draw/slow rinse (69). If it is at brine draw/slow rinse, the chlorinator time is loaded (70) and the slow rinse time is also loaded (71). The chlorinator relay is turned on (72) and a determination is made when the chlorinator timer times out (73). Once the chlorinator timer times out, the chlorinator relay is turned off (74).

A determination is made whether the probe is attached (75). If it is attached, the self-adjusting slow rinse subroutine is called (76).

A flowchart showing the slow rinse subroutine is set forth in FIGS. 4a–4c. This flowchart will be discussed below but first a completion of the discussion of the flowchart of FIGS. 3a–3c will be completed.

Referring now to FIG. 3d, after the slow rinse subroutine is performed (77) (which will be described below in association with FIGS. 4a–4c) the motor is turned on (78) and a determination is made as to whether the motor is at fast rinse position (79). Once the motor is at fast rinse position, the motor is turned off (80) and the fast rinse time is loaded into the timer (81). When the fast rinse timer times out (82), the motor is turned on (83) and a determination is made whether the motor is at home position (84). If the motor is at home position the motor is turned off (85) and regeneration is complete (86).

Referring to FIGS. 4a–4c, a flowchart of the self-adjusting slow rinse subroutine is illustrated. First, as set forth in FIG. 3b, when the motor is at brine draw/slow rinse, a maximum slow rinse timer is loaded (71). This timer can be loaded with, for example, 99 minutes (a longer time than the entire cycle should take) so that if the maximum slow rinse timer times out and this upper time limit of 99 minutes is reached, the system shuts off indicating that there is an aberration.

Referring back to FIG. 4a, a state timer is loaded (90) and started (91). A determination is made whether the probe is in state 1 (92). If the probe is not in state 1, the state timer is reloaded (90) and it continues to be reloaded until a determination is made that the probe is in state 1. Once the determination is made that the probe is in state 1, a determination is made whether the maximum slow rinse timer has timed out (93). If it has timed out (meaning the upper time limit has been reached), the cycle is discontinued because there is a problem. If the upper time limit (in this example 99 minutes) has not been reached, a determination is made whether the state timer has timed out (94).

In the illustrative embodiment (although no limitation is intended), the state timer for state 1 may be five minutes. Thus once five minutes has expired since the probe is in state 1, the state timer is loaded for the state 2 time (96) (FIG. 4b) and the state timer is started (97). A determination is made if the probe is in state 2 (98). So long as the probe is not in state 2, the state timer is reloaded (96) until the probe is in state 2. Once the probe is in state 2 a determination is made whether the maximum slow rinse timer has timed out (99) and if it has timed out and the upper time limit has been reached (100), the cycle is discontinued (101), indicating that there is a problem. If the upper time limit has not been reached, a determination is made whether the state timer has timed out (102). If the state timer has timed out the state timer is loaded with the time for state 3 (104). In the illustrative embodiment, the state 2 time is preferably about five minutes although no limitation is intended.

Referring to FIG. 4c, the state timer is loaded (104) and started (105) and a determination is made if the probe is in state 3 (106). So long as the probe is not in state 3, the state timer is reloaded (104). Once the probe is in state 3, a determination is made if the maximum slow time timer has timed out (107) and if so, the cycle is discontinued indicating a problem (108). So long as the upper time limit has not been reached, a determination is made whether the state timer has timed out (110). If the state timer has timed out, this indicates that state 3 has been completed and then the motor will be turned on (FIG. 3d) and a determination will be made if the motor is at a fast rinse position. In the illustrative embodiment, the timer for the third state is set to 15 minutes although no limitation is intended.

It is to be understood that the particular times set forth above can be varied and no limitation is intended by the specific times set forth herein. Further, flip flops could be utilized so that the first state could be an unbalanced state, the second state could be a balanced state and the third state could be an unbalanced state. Further, instead of determining whether the probe is in a particular state and reloading the state timer if it is not in the particular state, the state timer could be loaded and then not started until the determination is made that the probe is in the particular state.

Although an illustrative embodiment of the invention has been shown and described, it is to be understood that various modifications and substitutions may be made by those skilled in the art without departing from the novel spirit and scope of the present invention.

I claim:

1. A water softening method in which a determination is made whether the rinse cycle has been completed, which comprises the steps of:
providing a reference cell in a water tank and a spaced sensing cell in said water tank;
sensing the impedance difference of the solution in the water tank between the reference cell and the sensor cell;
if the impedance difference is a first state, then after a predetermined period of time determining if the impedance difference is a second state;
if the impedance difference is a second state, then after a predetermined period of time determining if the impedance difference is a third state;
if the impedance difference is a third state, then after a predetermined period of time completing a rinse cycle.

2. The water softening method as defined in claim 1, in which the first state is when the sensor cell impedance is less than or equal to the reference cell impedance.

3. A water softening method as defined by claim 1, in which the second state is when the sensor cell impedance is greater than the reference cell impedance.

4. A water softening method as defined by claim 1, in which the third state is when the sensor cell impedance is less than or equal to the reference cell impedance.

5. A water softening method as defined by claim 1, in which the first state is when the sensor cell impedance is less than or equal to the reference cell impedance; the second state is when the sensor cell impedance is greater than the reference cell impedance; and the third state is when the sensor cell impedance is less than or equal to the reference cell impedance.

6. A water softening method as defined by claim 1, including the step of providing a bridge with the reference and sensor cells as branches of the bridge.

7. A water softening method as defined by claim 6, in which the first state is when the bridge is balanced; the second state is when the bridge is unbalanced; and the third state is when the bridge is balanced.

8. A water softening method as defined in claim 1, in which the reference cell and the sensor cell are vertically spaced mounted electrodes.

9. A water softening method as defined in claim 1, in which the determining steps are performed with the aid of a microprocessor.

10. A water softening apparatus in which a determination is made whether the rinse cycle has been completed, which comprises:

a water tank;

a brine tank;

a conduit for providing brine from the brine tank to the water tank;

a conduit for providing water to the water tank;

a conduit for providing a path for water discharge from the water tank;

a reference cell in said water tank;

a spaced sensing cell in said water tank;

a circuit for sensing the impedance difference of the solution in the water tank between the reference cell and the sensor cell;

a microprocessor for aiding in determining if the impedance difference is a first state, thereafter determining if the impedance difference is a second state, thereafter determining if the impedance difference is a third state, and if the impedance difference is said third state for a predetermined period of time, then completing a rinse cycle thereafter.

11. A water softening apparatus as defined by claim 10, including a bridge in which the reference and sensor cells are branches of the bridge.

12. A water softening apparatus as defined by claim 11, in which said first state is when the bridge is balanced, said second state is when the bridge is unbalanced, and the third state is when the bridge is balanced.

13. A water softening apparatus as defined by claim 10, in which the rinse cycle is completed after a predetermined time after the occurrence of said third state.

14. A water softening method in which a determination is made whether the rinse cycle has been completed, which comprises the steps of:

providing a reference cell in a water tank and a spaced sensing cell in said water sensing the impedance differences of the solution in the water tank between the reference cell and the sensor cell;

determining if the impedance difference is a first state;

thereafter determining if the impedance difference is a second state that is different from said first state;

thereafter determining if the impedance difference is a third state different from said second state;

discontinuing a rinse cycle if the impedance difference is determined to be said third state.

15. A water softening method as described by claim 14, in which said second state determination is not made until a predetermined period of time elapses after the determination of said first state and said third state determination is not made until a predetermined period of time elapses after said determination of said second state.

* * * * *